United States Patent
Barber et al.

(10) Patent No.: US 7,699,751 B2
(45) Date of Patent: Apr. 20, 2010

(54) ELECTRIC PARK BRAKE SYSTEM

(75) Inventors: Phil Barber, Solihull (GB); Balbir Bhajam, Birmingham (GB); Tony Satterthwaite, Solihull (GB); Richard Woodhouse, Birmingham (GB); David Smith, Kineton (GB); Mark Irvine, Solihull (GB)

(73) Assignee: Land Rover (GB)

( * ) Notice: Subject to any disclaimer, the term of this patent is extended or adjusted under 35 U.S.C. 154(b) by 441 days.

(21) Appl. No.: 11/676,473

(22) Filed: Feb. 19, 2007

(65) Prior Publication Data

US 2007/0249465 A1 Oct. 25, 2007

(30) Foreign Application Priority Data

Apr. 25, 2006 (GB) .................. 0608045.1

(51) Int. Cl.
*B60W 10/06* (2006.01)
*B60W 10/18* (2006.01)
(52) U.S. Cl. ...................................... 477/197
(58) Field of Classification Search ............. 477/184, 477/197
See application file for complete search history.

(56) References Cited

U.S. PATENT DOCUMENTS

| 4,561,527 A | 12/1985 | Nakamoto et al. |
| 5,675,190 A | 10/1997 | Morita |
| 2008/0090702 A1 * | 4/2008 | Hopf et al. .................. 477/197 |

FOREIGN PATENT DOCUMENTS

| DE | 10357121 | 7/2005 |
| GB | 2-245-669 A | 1/1992 |
| WO | WO9015743 | 12/1990 |

* cited by examiner

*Primary Examiner*—Sherry L Estremsky
*Assistant Examiner*—Edwin A. Young
(74) *Attorney, Agent, or Firm*—Brooks Kushman P.C.

(57) ABSTRACT

A method for inhibiting automatic actuation of an electric parking brake (EPB) system of a motor vehicle is disclosed. The vehicle has an ignition switch for receiving an ignition key so as to mobilize or immobilize the vehicle. The EPB system includes an EPB mechanism for applying an actuating force to a park brake of the vehicle, an EPB control module for automatically applying the force when at least the ignition key is detected as removed from the ignition switch and an EPB control switch. The EPB control switch can be moved towards two instable positions from a neutral position respectively a brake release position and a brake apply position so as to apply or release the park brake. To inhibit the automatic actuation of the park brake, the driver has to complete within a specific time period the cycle of turning the ignition from off to on to off, pressing and maintaining the EPB control switch into the brake release position, removing the ignition key and releasing the EPB control switch after at least a predetermined time period. Such cycle of actions will be interpreted by the EPB control module as a wish to not apply the park brake.

4 Claims, 1 Drawing Sheet

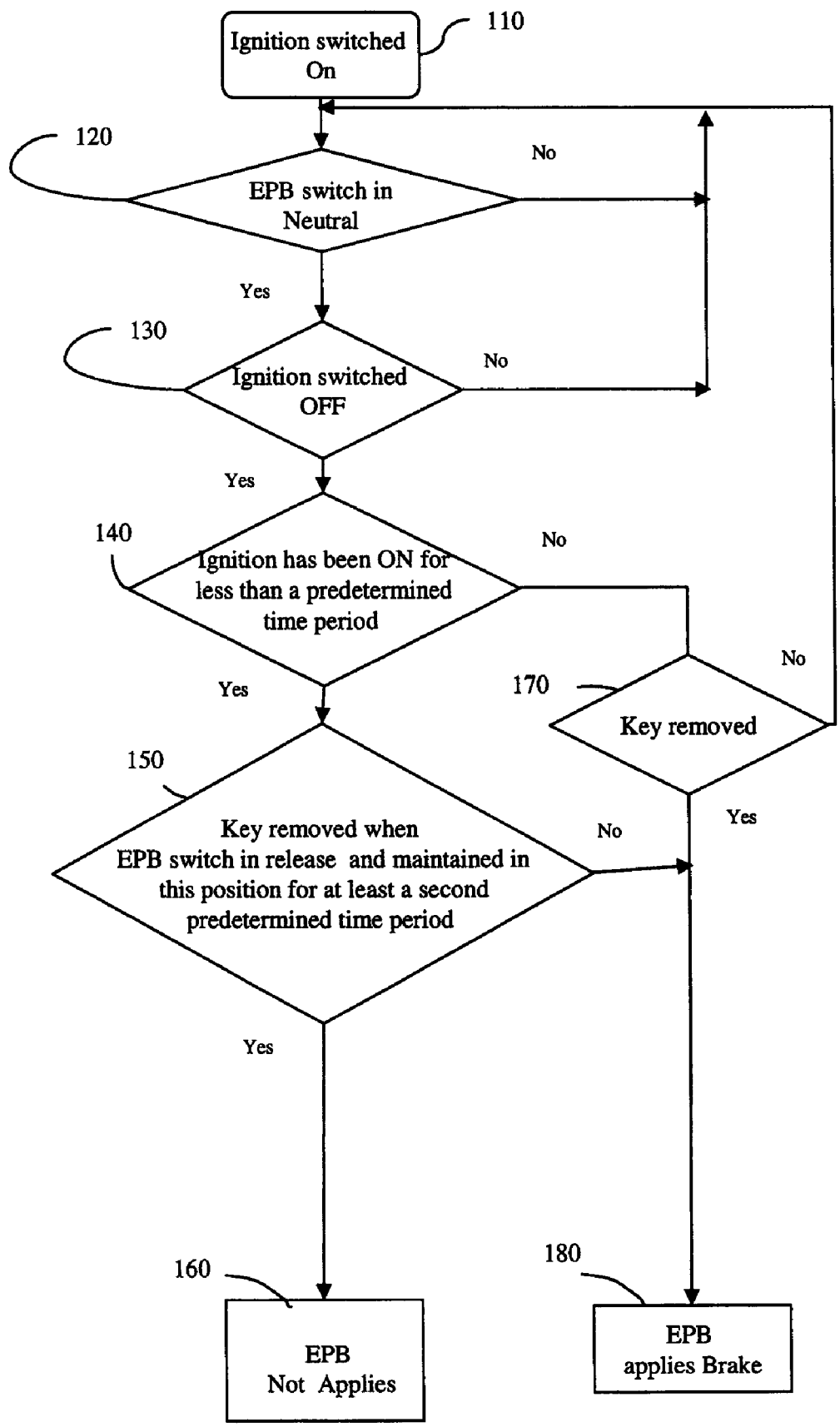

ELECTRIC PARK BRAKE SYSTEM

BACKGROUND OF THE INVENTION

1. Field of the Invention

The present invention relates to a method for inhibiting automatic actuation of electrically powered park brake (EPB) for a motor vehicle.

2. Background Art

Electrical parking brake (EPB) systems include an EPB mechanism for applying an actuating force to a park brake of the vehicle. The EPB mechanism is generally actuated in response to operation of an EPB control switch by the driver, the EPB control switch having a brake release position and a brake apply position. These EPB systems further comprise an electronic control module configured to automatically apply the park brake in response to a predetermined combination of vehicle operating conditions, e.g. removing the ignition key from the ignition switch. In certain circumstances, it may be necessary for the driver to leave the vehicle without the park brake applied. This is the case in extreme cold weather where there is a risk of the park brake freezing in the applied condition, thus immobilising the vehicle. To achieve this, the driver can hold the EPB control switch in the release position whilst removing the ignition key so as to inhibit the automatic actuation of the park brake force.

With such a method of inhibiting the automatic actuation of the EPB mechanism the driver could unintentionally prevent the EPB operating by accidentally pressing the EPB control switch when removing the ignition key.

SUMMARY OF THE INVENTION

It is an object of this invention to provide an improved method of inhibiting the automatic activation of the EPB.

According to the invention there is provided a method for inhibiting the automatic actuation of an electric parking brake (EPB) system of a motor vehicle, the vehicle having an ignition switch having a number of switch positions, the ignition switch having a recess for receiving an ignition key so as to move the ignition switch from a key out position, in which the key can be inserted and removed from the ignition switch, to another switch position representative of the vehicle being mobilized or immobilized, the EPB system including an EPB mechanism for applying an actuating force to a park brake of the vehicle, an EPB control module for automatically apply the park brake in response to a vehicle operating conditions and an EPB control switch, the EPB control switch having a brake release position and a brake apply position so as to apply or release the EPB mechanism, the method comprising the steps of:

a) mobilizing the vehicle by means of the ignition key being inserted into the ignition switch and being moved to the mobilized position from the key out position;

b) moving the ignition key to the immobilized position within a predetermined time period;

c) moving the EPB control switch to the brake release position d) holding the EPB control switch in the brake release position while e) removing the ignition key from the ignition switch;

f) checking that the EPB control switch has been maintained in the brake released position for at least a predetermined time period after the ignition key is removed, and g) providing an instruction command to inhibit the automatic actuation of the EPB mechanism so as to not apply the park brake.

Preferably, when the EPB control switch has a neutral position from which it can be moved towards the brake release position and the brake apply position which are two instable positions, the method further comprises, after the step a), checking that the EPB control switch is in the neutral position.

BRIEF DESCRIPTION OF THE DRAWINGS

The invention will now be described by way of example with reference to FIG. 1 which is a flow chart showing the method for inhibiting the automatic actuation of the parking brake force in an EPB system in accordance with the present invention.

DETAILED DESCRIPTION OF THE INVENTION

In a conventional manner, a motor vehicle includes an internal combustion engine, an ignition switch for turning on or turning off the engine ignition and an EPB system for applying an actuating force to a park brake of the vehicle. The ignition switch has a recess for receiving a mechanical ignition key configured to activate the ignition switch. The ignition switch is rotatable to a number of position switches representing various functions including KEY OUT, ignition OFF, and ignition ON positions. The KEY OUT position is the position in which the key can be inserted in to the ignition switch or be removed from the ignition switch. The terms "ignition switch", "ignition key", "ignition ON" and "ignition OFF" have traditionally been applied to motor vehicles with engines having spark ignition but have become generic to motor vehicles with Diesel engines, electric vehicles and hybrids electric vehicles, all of which may have an EPB system. Hence the terms "ignition ON" and "ignition OFF" represent switch positions where the vehicle is mobilized and immobilized respectively.

The EPB system includes an EPB mechanism, an EPB control switch and an EPB control module to automatically apply a park brake force in response to, for instance, the detection of the ignition key being removed from the ignition switch.

The EPB control switch has a toggle which can be pivoted, from a neutral position, in one direction to a brake apply position to cause the park brake to be applied and pivoted in another direction to a brake released position to cause the park brake to be released.

The EPB control module is connected, in a conventional manner, to a serial data bus, for example a Control Area Network (CAN), from which it receives input signals from different electronic components of the vehicle, that is the ignition switch, the control switch and an electronic motor control. The EPB control module is thus able to automatically apply a park brake force to the vehicle via the EPB mechanism or inhibiting this function according to a predetermined combination of vehicle operating conditions FIG. 1 illustrates the predetermined combination of vehicle operating conditions, checked by the EPB control module, which according to the present invention, permit inhibition of the automatic actuation of the park brake.

The control routine starts at 110, in which the engine ignition has previously been turned on by means of the key in the ignition switch.

Inquiries are made at steps 120 to 150 to check the overall status of the vehicle. In particular, an inquiry is made at 120 to determine whether the EPB control switch is in neutral position. If Yes, an inquiry is made at 130 as to whether the ignition has been turned OFF. If Yes an inquiry is made at 140 as to whether or not the ignition has been in the On position for less than a predetermined time period, for instance, in the order of twenty seconds. If Yes, an inquiry is made at 150 as to whether the EPB control switch is held in the brake released position when the ignition key is removed from the ignition switch and maintained in the brake released position for a predetermined time period, for instance at least one second, after the ignition key is detected as removed. A positive answer to any of these inquiries will transmit a command to inhibit the automatic activation of the EPB mechanism so as to not apply a brake force, at step 160.

On the contrary a negative answer to one of these inquiries will not inhibit the automatic activation of the EPB mechanism and as soon as the ignition key is detected as having been removed from the ignition switch, at step 170, the EPB control module will transmit a command to the EPB mechanism so as to apply a brake force, at step 180.

Such a method of inhibiting the automatic actuation of the EPB mechanism offers the advantage that a positive action by the driver is needed to move and hold the EPB control switch thus avoiding unintentional non application of the EPB. Furthermore such a method may prevent a non application of the EPB due to an object inadvertently pressing on the EPB control switch by detecting a neutral position then a release position of the EPB control switch during the cycle of ignition from OFF to On to OFF. Hence, the risk of inadvertently inhibit the automatic actuation of the EPB mechanism is reduced in comparison with the known EPB systems.

It will be appreciated that the method can also be applied to EPB switch having no Neutral position.

The invention claimed is:

1. A method for inhibiting the automatic actuation of an electric parking brake (EPB) system of a motor vehicle, the vehicle having an ignition switch having a number of switch positions, the ignition switch having a recess for receiving an ignition key so as to move the ignition switch from a key out position, in which the key can be inserted and removed from the ignition switch, to another switch position representative of the vehicle being mobilized or immobilized, the EPB system including an EPB mechanism for applying an actuating force to a park brake of the vehicle, an EPB control module for automatically applying the park brake in response to vehicle operating conditions and an EPB control switch, the EPB control switch having a brake release position and a brake apply position so as to apply or release the EPB mechanism, the method comprising the steps of:
   a) mobilizing the vehicle by means of the ignition key being inserted into the ignition switch and being moved to the mobilized position from the key out position;
   b) moving the ignition key to the immobilized position within a predetermined time period;
   c) moving the EPB control switch to the brake release positions;
   d) holding the EPB control switch in the brake release position while
   e) removing the ignition key from the ignition switch;
   f) checking that the EPB control switch has been maintained in the brake release position for at least a predetermined time period after the ignition key is removed, and
   g) providing an instruction command to inhibit the automatic actuation of the EPB mechanism so as to not apply the park brake.

2. A method as claimed in claim 1 in which the EPB control switch has a neutral position from which it can be moved towards the brake release position and the brake apply position which are two instable positions, the method further comprising, after the step a), checking that the EPB control switch is in the neutral position.

3. A method as claimed in claim 1 in which the first predetermined time period is of the order of twenty seconds.

4. A method as claimed in claim 1 in which the second predetermined time period is of the order of one second.

* * * * *